Patented Nov. 24, 1936

2,061,635

UNITED STATES PATENT OFFICE 2,061,635

PROCESS OF PRODUCING PARTICULARLY STABLE CONDENSATION PRODUCTS

Kurt Sändig, Zwickau, Germany, assignor to firm The Resinous Products & Chemical Co., Inc., Philadelphia, Pa.

No Drawing. Application November 29, 1932, Serial No. 644,918. In Germany December 7, 1931

12 Claims. (Cl. 260—8)

This invention relates to the purification of synthetic resins of the alkyd type.

The resinous solid and balsam-like plastic to viscous condensation products of polyvalent alcohols and polybasic acids or the derivatives of these substances show in practical use various disadvantages which up to now have prevented their more extensive utilization. A particularly bad quality is the strongly acid nature of the still fusible and soluble initial condensates existing above all in the curable products, whereby the molds are adversely affected as well as the filling and textile materials. A further disadvantage is the extraordinary long period required for hardening the products, for which, for instance, several weeks of heating at 120 to 130° C. are prescribed. Another great disadvantage, particularly in the case of unhardenable products which are used in the unhardened state and also in the case of such substances modified with fatty acids, fatty oils, monobasic organic acids, resins etc., is that they are very quickly and strongly attacked by water or aqueous solutions. For example coats of paint produced with them are thus destroyed.

It has now been found that the above mentioned disadvantages may be traced to the existence of initial substances which have not been chemically combined during the reaction and also to low-molecular reaction products. Should it be possible to separate these harmful constituents from the high-grade high-molecular products, waterproof, weather resistant products are formed which may be worked up also with basic pigments.

It is a surprising discovery that the uncombined initial substances as well as the low-molecular reaction products can be easily removed by a simple treatment with suitable solvents.

Thus the product of condensation obtained from glycerin, phthalic acid and lemon acid in well known manner, which may be dissolved in a little alcohol or benzene-alcohol mixture, may be broken up in two portions by treatment with double the quantity of ethyl alcohol, for example industrial alcohol or denaturated alcohol. The separated product represents a concentrated about 80 per cent alcoholic solution, which hardens partly even on evaporation, and by heating to about 130° C. for a short time it passes into an insoluble and infusible state. With the original condensation product it is, on the other hand, necessary to heat for about 10 hours at 150° C., before a corresponding hardening occurs. The acid value has dropped to about one half by this treatment. The new product is particularly suitable for the manufacture of artificial masses, which are manufactured in known manner with or without an addition of fillers, fibres, coloring-matters and the like, if necessary with application of heat and pressure.

The treatment with ethyl alcohol may be carried out in the cold or under application of heat. Instead of ethyl alcohol other alcohols, such as methyl and propyl alcohol, may be employed or such solvents which are able to dissolve the low-molecular condensation products to a wide extent, but which, on the other hand, are not distinct solvents for the high-molecular condensation product. The quantity of alcohol used is immaterial so long as it is in excess of that quantity which is miscible with the synthetic resin in the cold and the phrase "in an excess of alcoholic solvent" as hereinafter used is intended to mean a quantity of alcoholic solvent that exceeds the quantity that at room temperature is completely miscible with the synthetic alkyd resin.

The initial material might also first be dissolved in acetone, for example, whereupon after addition of much ethyl alcohol the particularly strongly solvent acetone is distilled off and the remaining mixture is allowed to stand in the cold state until complete separation occurs of the portion insoluble in alcohol. As a rule it is, however, by no means necessary to make use of an additional special solvent, such as acetone, and the condensation products may be directly treated with alcohol.

The process is, for example, carried out in such a way that the condensation product prepared in known manner from castor oil, phthalic acid anhydride and glycerin is heated with triple the quantity of ethyl alcohol, so that a clear solution is formed. During the cooling a highly concentrated solution of the high-molecular condensation products settles at the bottom, while the upper layer is a diluted solution of the non-combined initial substances and low-molecular condensation products. The former show a considerably lower acid value, considerably higher waterproofness, and improved drying capacity, which is of great importance for their utilization in nitro-cellulose lacquers and for other lacquers in general.

The low-molecular constituents may either be condensed again, or be used for certain purposes, for example as an addition to acetyl cellulose masses.

The substances produced in the above manner may be utilized in many ways, for instance as artificial masses for the manufacture of articles of any suitable kind, in the form of solutions as lacquers and paints, in combination with known additions, such as oils, pigments, resins of natural as well as artificial qualities, drying agents or siccatives, or in combination with nitro-cellulose and so on.

I claim as my invention:—

1. A process for purifying condensation products of the alkyd resin type, comprising dissolving both the desirable and undesirable components of the unpurified product in 1–3 times the amount of an alcoholic solvent under the influence of heat, cooling the solution until it separates into two layers, and recovering the purified dissolved condensation product from the lower layer.

2. A process for purifying the condensation products of the alkyd resin type comprising dissolving both the desirable and undesirable components of the unpurified product in a small quantity of a mixture of benzol and alcohol, agitating the resulting concentrate in the cold state in 1–3 times the amount of alcoholic solvent, allowing the solution to stand until it separates into two layers, and recovering the purified dissolved condensation product from the lower layer.

3. A process for purifying the condensation products of the alkyd resin type comprising dissolving both the desirable and undesirable components of the unpurified product in a small quantity of alcohol, agitating the resulting concentrate in the cold state in 1–3 times the amount of alcohol solvent, allowing the solution to stand until it separates into two layers, and recovering the purified dissolved condensation product from the lower layer.

4. The process of extracting synthetic resins of the alkyd type which comprises heating said resin in an excess of an alcoholic solvent until all the resin is dissolved, cooling said solution, separating the two layers thus produced, and recovering the purified resin from the lower layer.

5. The process of extracting synthetic resins of the alkyd type which comprises heating said resin in an excess of an alcoholic solvent selected from the group consisting of methyl, ethyl and propyl alcohols until all the resin is dissolved, cooling said solution, separating the two layers thus produced, and recovering the purified resin from the lower layer.

6. The process of extracting synthetic resins of the alkyd type which comprises heating said resin in an excess of ethyl alcohol until all the resin is dissolved, cooling said solution, separating the two layers thus produced, and recovering the purified resin from the lower layer.

7. The process of separating low molecular weight condensation products of a polyhydric alcohol and a polybasic acid from high molecular weight condensation products thereof which comprises dissolving a synthetic resin containing mixtures thereof in an excess of a heated alcoholic solvent to form a clear solution, cooling the solution until it separates into two layers, and recovering the dissolved condensation product from the respective layers.

8. The process of separating low molecular weight condensation products of a polyhydric alcohol and a polybasic acid from high molecular weight condensation products thereof which comprises dissolving a synthetic resin containing a mixture thereof in an excess of a heated alcoholic solvent of the group consisting of methyl, ethyl and propyl alcohols to form a clear solution, cooling the solution until it separates into two layers, and recovering the dissolved condensation product from the respective layers.

9. The process of separating low molecular weight condensation products of a polyhydric alcohol and a polybasic acid from high molecular weight condensation products thereof which comprises dissolving a synthetic resin containing mixtures thereof in an excess of hot ethyl alcohol to form a clear solution, cooling the solution until it separates into two layers, and recovering the dissolved condensation product from the respective layers.

10. The process of purifying condensation products of the alkyd resin type which comprises dissolving both the desirable and undesirable components of the unpurified product in a small quantity of an alcoholic solvent, agitating the resulting concentrate in an excess of the alcoholic solvent, allowing the solution to stand, and recovering the purified dissolved condensation product from the lower layer thereof.

11. The process of purifying condensation products of the alkyd resin type which comprises dissolving both the desirable and undesirable components of the unpurified product in a small quantity of an alcoholic solvent selected from the group consisting of methyl, ethyl and propyl alcohols, agitating the resulting concentrate in an excess of the alcoholic solvent, allowing the solution to stand, and recovering the purified dissolved condensation product from the lower layer thereof.

12. The process of purifying condensation products of the alkyd resin type which comprises dissolving both the desirable and undesirable components of the unpurified product in a small quantity of ethyl alcohol, agitating the resulting concentrate in an excess of ethyl alcohol, allowing the solution to stand, and recovering the purified dissolved condensation product from the lower layer thereof.

KURT SÄNDIG.